United States Patent Office 2,788,120
Patented Apr. 9, 1957

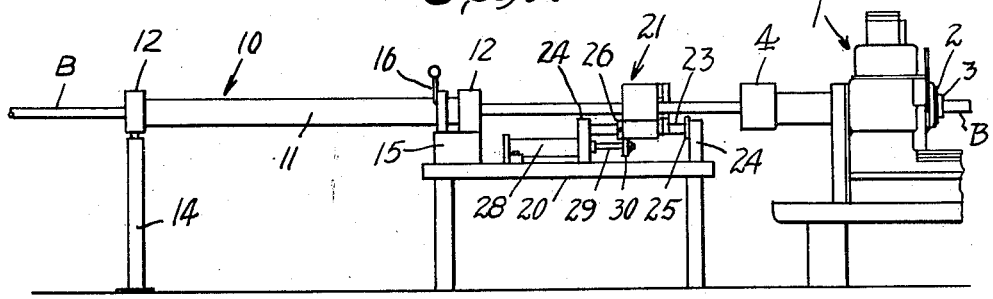

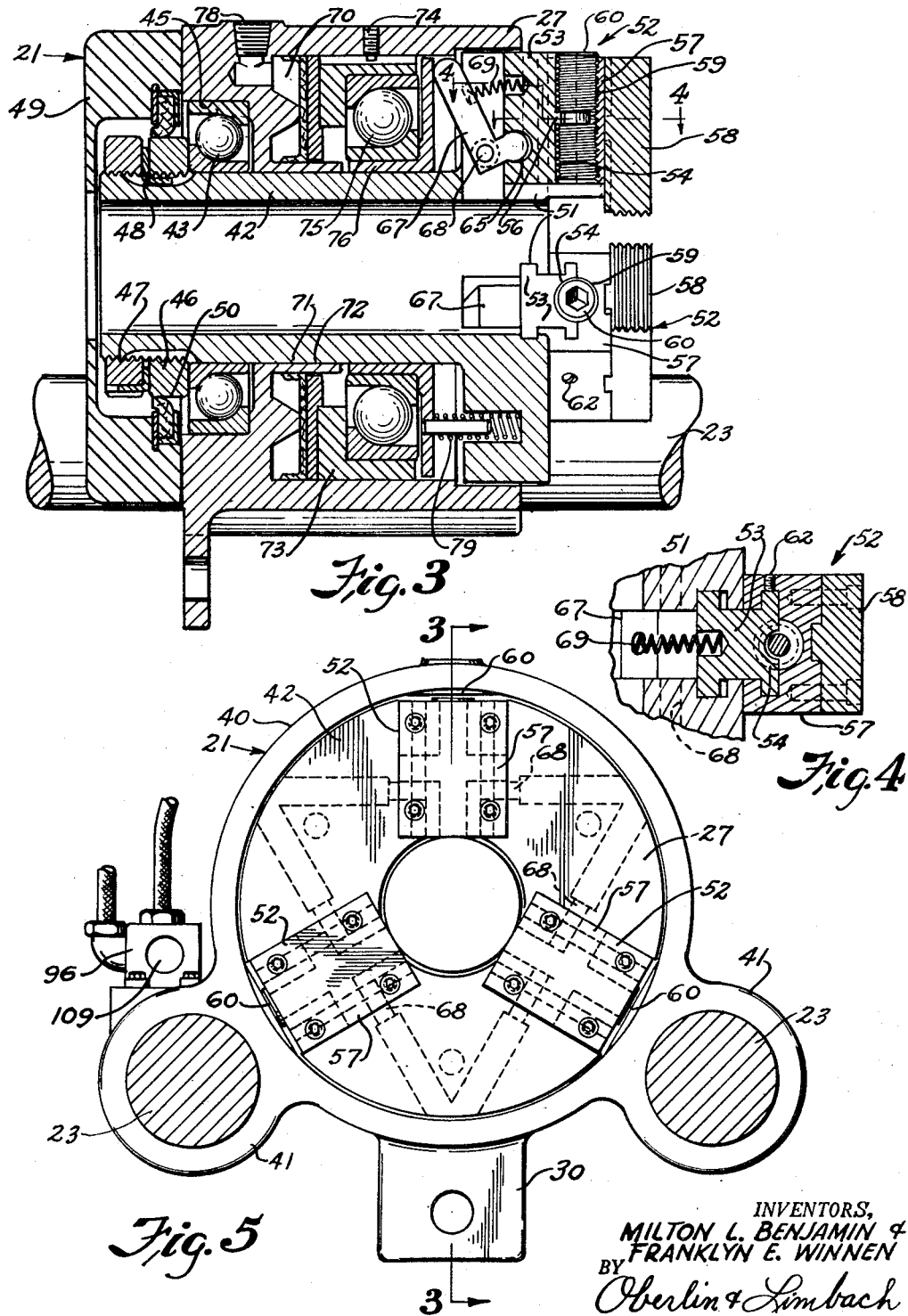

2,788,120

STOCK FEED DEVICE

Milton L. Benjamin and Franklyn E. Winnen, Cleveland, Ohio; said Benjamin assignor, by direct and mesne assignments, to Erickson Tool Company, a corporation of Ohio Application January 11, 1955, Serial No. 481,243

16 Claims. (Cl. 203—150)

The present invention relates generally as indicated to a stock feed device, and more particularly to a device for incrementally feeding bar stock through the spindle of a screw machine or the like for operation upon by drills, reamers, taps, form tools, and finally a cut-off tool which cuts off the finished part from the end of the bar stock.

In the case of turret lathes, for example, the bar stock is gripped by the spindle collet during machining, and, after cutoff of the machined end of the bar, a ratchet bar feed device or a device with friction fingers or rolls feeds the bar forward, such device being operated either by hand or semi-automatically. During the machining operation, the rear end of the rotating bar usually rather loosely fits in a stationary support tube and thus whip around in the latter and, in turn, such whipping induces chatter and other undesirable vibrations at the front spindle end, and consequently the machined parts may be inaccurate and have chatter marks. Moreover, the bar surface may be marred by the whipping thereof in the support tube and by the ratchet or like feed device.

In order to obviate the foregoing and other difficulties, it is one general object of this invention to provide a stock feed device which, in combination with the machine tool spindle, is operative to rotatably support the bar at spaced-apart points therealong to thus eliminate the detrimental effects caused by the otherwise whipping rear end portion thereof.

Another object of this invention is to provide a stock feed device which is operative to advance the bar stock gripped thereby uniformly any adjustable distance after each cut-off of a finished part at the spindle end thereof.

Another object of this invention is to provide a simple form of automatic control for the stock feed device, including independent controls for the release of the spindle collet, and for the release of the bar feed chuck.

Another object of this invention is to provide adjustable stops for the bar feed chuck release and closure at certain stages of the reciprocatory movements of the stock feed device.

Another object of this invention is to provide a novel fluid pressure system for achieving the desired control of the operating cycle of the stock feed device in relation to the operation of the spindle collet.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In said annexed drawings:

Fig. 1 is a side elevation view showing the stock support tube, the stock feed device, and the head stock of a turret lathe;

Fig. 2 is a top plan view, on somewhat enlarged scale, of the stock feed device;

Fig. 3 is a central vertical cross-section view of the stock feed device taken substantially along the line 3—3, Fig. 5;

Fig. 4 is a cross-section view taken substantially along the line 4—4, Fig. 3;

Fig. 5 is a front end elevation view of the stock feed device as viewed from the righthand end of Fig. 3; and Fig. 6 is a schematic piping diagram showing the fluid pressure control system for reciprocating the stock feed device coaxially toward and away from the turret lathe spindle, for operating the chuck in the stock feed device, and for operating the machine tool spindle collet.

GENERAL STRUCTURE OF STOCK FEED ASSEMBLY

*(a) Turret lathe and spindle collet actuator*

Referring now more particularly to the drawings, and first to Fig. 1, the reference numeral 1 denotes generally the head stock end of a conventional turret lathe which has therein a rotary hollow spindle 2 equipped with a contractible spring collet 3 in the spindle nose, said collet 3 being operated as by means of the collet-actuating cylinder 4 which has therein a piston operatively connected to a tubular sleeve for movement of the latter in one direction to contract the collet 3 so as to grip a bar B therewithin and for movement in the opposite direction to release the collet from said bar B.

The construction of the collet actuator 4 is not shown in detail herein but may comprise a mechanism such as is disclosed in our Patent No. 2,515,183, granted July 18, 1950.

*(b) Stock loader and support*

Rearward of the turret lathe 1 and aligned with the spindle 2 is the bar stock loader 10 which herein is shown as comprising a horizontally disposed feed tube 11, and within the end collars 12 thereof are located anti-friction bearings, and, in turn, the inner races of said bearings will interchangeably carry tubes of inside diameter approximately the same diameter as the bar stock B to be loaded into the loader, and thus the rear end of the bar stock is supported against excessive whipping.

Said feed tube 11 is supported at its rear end on a standard 14 to which the feed tube is mounted for swinging about a vertical axis. The front end of said feed tube 11 rests upon a support 15 and a clamp 16 is provided to normally hold the feed tube 11 in alignment with the lathe spindle 2. However, by releasing the clamp 16, the front end of the feed tube may be swung to the dotted position of Fig. 2 to enable loading of the bar stock B therefrom in instances where space is at a premium rearward of the rear end of said feed tube.

In other words, in order to load a 20 ft. long bar B into the rear end of the feed tube 11, a 20 ft. clearance is required; whereas, by loading from the front end of the feed tube 11, the required clearance may be reduced by an amount corresponding to the length of the feed tube 11.

*(c) The stock feed device generally*

Between the lathe 1 and the bar stock loader 10, and supported on a table 20 which also carries the support 15 for the front end of the feed tube 11, is the bar stock feed device 21 which constitutes the present invention.

Said stock feed device 21 includes a pair of parallel guide bars 23 joined together by cross heads 24 at opposite ends, the forward cross head having a stop boss 25 thereon, and one of the guide bars 23 having an adjustable stop collar 26 thereon. The distance that the stock feed device 21 may reciprocate in opposite directions is determined by the distance between said stop boss 25 and said stop collar 26.

Reciprocable on said guide bars 23 is the feed device chuck 27, one end of which is adapted to abut said stop boss 25 to determine the feeding movement from the retracted position, and the other end of which is adapted to abut the stop collar 26 to limit the retraction movement and to determine the distance that said chuck 27 subsequently moves forward. The stock feed device 21, or, more particularly, the chuck 27 thereof, is thus reciprocated on the guide bars 23 as by means of a double-acting pneumatic cylinder 28, the piston and piston rod 29 of which is connected to the bracket 30 on the underside of said chuck 27.

DETAIL STRUCTURE OF STOCK FEED DEVICE

Referring now in detail to said stock feed device 21 and chuck 27, the latter comprises a generally cylindrical housing 40 including tubular elongated lugs 41 slidable on the guide bars 23. Journalled in said housing 40, as best shown in Fig. 3, is a clamping jaw sleeve 42. The anti-friction bearing 43 which so journals the jaw sleeve in said housing is herein shown as having its outer race fit snugly into a counterbored recess 45 in the housing and its inner race snugly fitted on the jaw sleeve 42 and held in place as by means of the nuts 46 and 47 having therebetween a lock washer 48 keyed to the jaw sleeve and provided with bendable lugs or keys non-rotatably engaging peripheral grooves in the rear nut 47.

The housing 40 is provided with a cover 49 bolted or otherwise secured thereto, and between the cover and the front nut 46 is a packing ring 50 to prevent escape of bearing lubricant and also to prevent ingress of foreign matter into said bearing 43.

The front end of said jaw sleeve 42 is formed with a radially extending flange which is formed with a plurality of radially extending T-slots 51, herein three being shown. Radially slidably mounted in each T-slot is a clamping jaw assembly 52, said assembly comprises a base part 53 radially slidable in the slot, and formed on the outer face thereof with a semi-cylindrical radially extending groove 54 which has a semi-cylindrical rib 56 projecting therefrom.

In turn, a jaw part 57 is radially adjustable with respect to said base part 53 and is adapted to have bolted thereto a jaw 58 preferably having an inner surface conforming with the diameter or cross-section shape of the bar stock B to be gripped between the three jaws 58. The adjustable jaw part 57 is formed with a semi-cylindrical, radially extending groove 59 which is threaded for threaded engagement with an adjusting screw 60, the latter being rotatable in the opening formed by the mating base and adjustable parts 53 and 57, said screw 60 being held against movement radially of the chuck 27 by means of the rib 56 engaged in the peripheral groove 61 of said screw. It can thus be seen that rotation of said screw 60 in opposite directions will move the adjustable jaw part 57 and jaw 58 bolted thereto radially inwardly and outwardly with respect to the axis of the jaw sleeve 42. Locking of the adjustable jaw part 57 in a desired position with respect to the base part 53 is effected as by means of a set screw 62.

The rear face of each jaw base part 53 is formed with a generally semi-cylindrical transverse recess or groove 65 in which the rounded leg of a bell crank lever 67 is oscillatably fitted. Each bell crank lever 67 is pivotally mounted on a pin 68 which extends transversely across the associated slot 51 of the sleeve; and, as evident particularly from Fig. 3, when the other leg of said bell crank 67 is swung in a clockwise direction about pin 68, the corresponding rotation of the said one leg will cause the entire jaw assembly 52 to move radially inward. Shifting of each jaw radially outwardly is effected by a spring 69 compressed between each jaw and said other leg of the bell crank 67.

The housing 40 is formed with an annular recess 70 which constitutes a cylinder for an annular piston 71, said piston comprising a ring of flexible material (leather, rubber, flexible plastic, or the like) provided with axially extending lips adapted to form a fluid-tight sliding seal with the inner and outer walls of said cylinder 70.

Said piston 71 includes also a backing member 72 and, in turn, the backing member 72 bears against the radial flange of a ring 73 which is axially slidably keyed by key screw 74 in the housing 40 and which ring 73 has snugly fitted therein the outer race of an anti-friction bearing 75. The inner race of said bearing 75 is snugly fitted on the axial flange of an L-shaped cross-section ring 76, and the radial flange of said ring 76 is adapted to contact the outer legs of the bell crank levers 67.

By reason of the anti-friction bearing 75, the rotation of the jaw sleeve 42 and parts carried thereby is not transmitted to the annular piston 71. Further, by reason of said anti-friction bearing 75, a single key screw 74 engaged in a single groove of the ring 73 suffices, since the torque is negligible. The housing 40 is provided with a threaded port 78 through which air or other fluid under pressure is adapted to be admitted into the cylinder 70 so as to act on the annular piston 71 tending to move the same toward the right as viewed in Fig. 3.

The foregoing cylinder-piston assembly is the chuck actuating device and is operative as already described to move the jaws 52 simultaneously radially inwardly into firm coaxial gripping engagement with the bar stock B extending through the jaw sleeve 42. Springs 79 are compressed between the ring 76 and the flange 51 of the jaw sleeve 42, and these springs 79, together with the springs 69 acting on the bell crank levers 67, are effective to return the annular piston 71 to its lefthand inactive position upon release or exhaust of the fluid under pressure acting thereon; and, of course, such movement of the bell crank levers 67 in counterclockwise direction moves the three jaws 52 radially outward to release the grip on the bar stock B.

THE FLUID CONTROL SYSTEM

Having thus described in detail the mechanical structure of the stock feed device 21 and chuck 27 herein, reference will now be made to the schematic piping diagram of Fig. 6 wherein 85 is the main air pressure supply pipe, 86 are combination filters, oilers, and pressure regulators in the branch pipes 87, 89 is a main control valve, 90 is an independent spindle collet control valve, 91 is a quick-exhaust valve, 92 is an independent jaw chuck control valve, 93 is a four-way spring and fluid-pressure-actuated reversing valve, 94 and 95 are combination check and throttle valves which permit free flow of fluid under pressure into the cylinder 28 and controlled throttled exhaust therefrom, and 96 is the main jaw control valve.

It is to be understood that the particular valves, etc. as shown in Fig. 6 are merely illustrative, and where rotary plug type valves are shown, equivalent spool or other valves may be readily substituted. Similarly, wherein spool type valves are shown, rotary selector and reversing valves and the like may be substituted.

Insofar as the main control valve 89 is concerned, it is herein shown as a rotary plug valve which, in one position, (the position shown) communicates fluid under pressure from the branch pipe 87 to the spindle collet-actuating cylinder 4 by way of the independent collet control valve 90, and the quick-exhaust valve 91, and at the same time communicates the cylinder end of the four-way reversing valve 93 by way of the pipe 97 to the exhaust port of said main control valve 89.

The independent collet control valve 90 and the independent jaw control valve 92 each have two positions, one as shown, and the other communicating the associated cylinder 4 and 27 with the valve-exhaust port.

The quick-exhaust valve 91 is herein shown by way of example only as including a check valve 98, the skirt of which closes the valve exhaust port during the flow of fluid under pressure into the collet-actuating cylinder 4 and which, when the main control valve 89 is actuated to exhaust the pipe leading to the collet cylinder 4, moves to the right, opening the valve-exhaust port to thereby rapidly release the pressure in the collet cylinder 4.

The combination check and throttle valve units 94 and 95 require no further explanation, since all that each consists of is a check valve and a throttle valve connected together in parallel.

The four-way reversing valve 93 is herein shown as comprising a cylindrical body in which a spool 99 is reciprocably mounted, the spool being urged toward the right by the spring 100 and urged toward the left by fluid under pressure acting on the piston head 101 thereof. In the position of the spool shown in Fig. 6, fluid under pressure in the branch pipe 87 enters a port of the body and passes out through another port and through the check valve-throttle valve unit 95 into the righthand port of the cylinder 28 to thus move the piston 29 therein toward the left. The fluid in the cylinder 28 to the left of the piston 29 is displaced through the lefthand cylinder port, and at a desired controlled rate through the throttle valve of the combination unit 94 and thence through communicating ports of valve 93 to the atmosphere.

When fluid under pressure is admitted into the righthand end of valve 93, the spool 99 is moved toward the left under the influence of the pressure acting on piston head 101, and thus fluid under pressure in pipe 87 will pass through valve 93 and combination unit 94 into the lefthand side of the cylinder 28. Correspondingly, the fluid displaced from the righthand end of the cylinder 28 passes through the adjusted throttle valve of the combination unit 95 and into the valve 93 and out through the exhaust port of the latter.

The jaw chuck control valve 96 is preferably mounted on the housing 40 of the stock feed device and is shown herein as comprising a three-port cylindrical body 105, one port 106 being an exhaust port, a second port 107 being the fluid pressure inlet port, and the third port 108 being the service port which leads to the jaw chuck cylinder 27 by way of the independent jaw control valve 92.

Reciprocable within said body 105 is a spool 109, the opposite ends of which are adapted to alternately engage the stop boss 25 and the adjustable stop collar 26, and when so engaged with the stop collar 26, as shown, fluid under pressure is admitted into the chuck cylinder 27, and when so engaged with the stop boss 25, the spool is shifted toward the left so as to exhaust said chuck cylinder by way of port 106 communicating with port 108.

OPERATION

In the position of the valves 89, 90, 91, 92, 93, and 96 as shown in Fig. 6, the stock feed device 21 is in its retracted position, the jaw chuck 27 is in its bar stock gripping position, and the spindle collet-actuating cylinder 4 is in the collet-closing position. Thus, the rotating bar stock B is securely held in the spindle collet 3 and in the feed device chuck 27 at relatively widely spaced-apart points which afford a rigid journalled mounting for the bar stock so that it will rotate true and accurate without play either axially or radially, whereupon the turret and cross-slide tools may most efficiently perform their intended functions.

After the finished product has been cut off, the operator will turn the main control valve 89 to its other position, thereby communicating the collet cylinder 4 to the exhaust port of said valve 89 and communicating the pressure inlet port of said valve by way of the pipe 97 to the cylinder end of the four-way reversing valve 93.

As aforesaid, the releasing of the pressure in the collet cylinder 4 opens the spindle collet 3, and this is achieved rapidly because of the quick exhaust of the fluid under pressure through the exhaust port of the quick-exhaust valve 91.

The presence of fluid under pressure in the cylinder end of the reversing valve 93 shifts the spool 99 therein to the left, whereby, as already explained, fluid under pressure enters the lefthand of the cylinder 28 to force the piston 29 toward the right with corresponding movement of the stock feed device 21 toward the right. The jaw control valve 96 remains in its jaw-closing position, whereby the bar stock B gripped between the jaws 52 is fed through the lathe spindle 2.

Now, as the righthand end of the jaw control valve spool 109 engages the stop boss 25, the fluid under pressure in the chuck cylinder 27 is exhausted from port 106, thus releasing the jaws 52 from the bar stock. This constitutes the longitudinal feeding movement; and, of course, the amount thereof depends upon the setting of the adjustable stop collar 26 along the guide bar 23.

The operator then returns the main control valve 89 to the position shown in Fig. 6 to initiate the retraction movement of the feed device 21 while its chuck 27 is disengaged from the bar stock B and while the spindle collet 3 grips the bar stock.

The independent collet control valve 90 serves as an emergency valve to release the spindle collet 3 without affecting the position of the stock feed device 21 or the condition of its chuck 27. Similarly, the independent jaw control valve 92 permits opening of the jaw chuck 27 at any time without regard to the condition of the spindle collet 3 or the position of the piston 29 in the cylinder 28.

Instead of employing air as the motivating fluid, it is to be understood that oil or other liquid may be employed, and in such event the valve exhaust ports will have pipes connected thereto to return the oil to a reservoir or pump.

Other modes of applying the principle of the invention may be employed, change being made as regards the details described, provided the features stated in any of the following claims, or the equivalent of such, be employed.

We therefore particularly point out and distinctly claim as our invention:

1. In combination, a machine tool having a collet-equipped spindle in which bar stock is adapted to be alternately gripped and released for rotation with said spindle and for longitudinal feeding movement therethrough, a collet actuator, a support, a bar stock feeding device coaxially reciprocable on said support toward and away from an end of said spindle, a chuck journalled in said device and adapted to alternately grip and release an adjoining portion of the bar stock extending therethrough, a chuck actuator, drive means for reciprocating said device and the chuck journalled therein, and control means effective to actuate said collet and chuck actuators so that the bar stock is gripped by said spindle and by said chuck and is rotated by the former and to actuate said collet actuator and said drive means to respectively release the bar stock in said spindle and to move said device toward said spindle to thus longitudinally feed the bar stock gripped by said chuck.

2. In combination, a machine tool having a collet-equipped spindle in which bar stock is adapted to be alternately gripped and released for rotation with said spindle and for longitudinal feeding movement therethrough, a collet actuator, a support, a bar stock feeding device coaxially reciprocable on said support toward and away from an end of said spindle, a chuck journalled in said device and adapted to alternately grip and release an adjoining portion of the bar stock extending therethrough, a chuck actuator, drive means for reciprocating said device and the chuck journalled therein, and control means effective to actuate said collet and chuck actuators to respectively grip and release the bar stock extending through said spindle and said chuck and to actuate said drive means to move said device away from said spindle preparatory to actuation of said chuck actuator to bar stock gripping condition, said control means further being effective, at the conclusion of the last-mentioned movement of said device, to actuate said chuck actuator to grip the bar stock whereby the bar stock is gripped by said spindle and by said chuck and is rotated by the former.

3. In combination, a machine tool having a collet-equipped spindle in which bar stock is adapted to be alternately gripped and released for rotation with said spindle and for longitudinal feeding movement therethrough, a collet actuator, a support, a bar stock feeding device coaxially reciprocable on said support toward and away from an end of said spindle, a chuck journalled in said device and adapted to alternately grip and release an adjoining portion of the bar stock extending therethrough, a chuck actuator, drive means for reciprocating said device and the chuck journalled therein, and control means effective in one position to move said device away from said spindle while said chuck is released from the bar stock and while said spindle grips the bar stock and to actuate said chuck to bar stock gripping condition whereby the bar stock is gripped by said spindle and said chuck and is rotated by the former, and in another position to actuate said collet actuator to bar stock releasing condition and to move said device toward said spindle whereby the bar stock gripped in said chuck is fed longitudinally through said spindle.

4. In combination, a machine tool having a rotating spindle equipped with a collet for gripping and releasing bar stock adapted to extend through said spindle, a single-acting cylinder which is fluid pressure actuated in one direction to close said collet to bar stock gripping condition and spring actuated in the opposite direction to open said collet to bar stock releasing condition, a fluid pressure source, a first valve operative to direct fluid under pressure from said source into said cylinder and to release such fluid under pressure from within said cylinder, a support, a bar stock feeding device coaxially reciprocable on said support toward and away from an end of said spindle, a chuck journalled in said device, another single-acting cylinder which is fluid pressure actuated in one direction to close said chuck to bar stock gripping condition and spring actuated in the opposite direction to open said chuck to bar stock releasing condition, a second valve carried by said device and operative at the conclusions of the reciprocatory movements of said device to respectively direct fluid under pressure into and to release such fluid under pressure from within said another cylinder, a double-acting cylinder operatively connected to said device for reciprocating the latter, and a third valve operative to direct fluid under pressure into either end of said double-acting cylinder and to exhaust the fluid under pressure in the other end, said third valve being fluid pressure operated in one direction and having a fluid connection with said first valve whereby said device is moved toward said spindle while said collet is in bar stock releasing condition to thus longitudinally feed the bar stock gripped by said chuck.

5. In combination, a machine tool having a rotating spindle equipped with a collet for gripping and releasing bar stock adapted to extend through said spindle, a single-acting cylinder which is fluid pressure actuated in one direction to close said collet to bar stock gripping condition and spring actuated in the opposite direction to open said collet to bar stock releasing condition, a fluid pressure source, a first valve operative to direct fluid under pressure from said source into said cylinder and to release such fluid under pressure from within said cylinder, a support, a bar stock feeding device coaxially reciprocable on said support toward and away from an end of said spindle, a chuck journalled in said device, another single-acting cylinder which is fluid pressure actuated in one direction to close said chuck to bar stock gripping condition and spring actuated in the opposite direction to open said chuck to bar stock releasing condition, a second valve carried by said device and operative at the conclusions of the reciprocatory movements of said device to respectively direct fluid under pressure into and to release such fluid under pressure from within said another cylinder, a double-acting cylinder operatively connected to said device for reciprocating the latter, and a third valve operative to direct fluid under pressure into either end of said double-acting cylinder and to exhaust the fluid under pressure in the other end, said third valve being fluid pressure actuated in one direction and spring actuated in the opposite direction and having a fluid connection with said first valve whereby said device is moved away from said spindle while said collet is in bar stock gripping condition and while said chuck is in bar stock releasing condition.

6. In combination, a collet and a chuck in coaxial alignment and in which bar stock is adapted to be gripped, fluid pressure collet and chuck actuators for actuating said collet and said chuck into and out of gripping engagement with the bar stock, bearings rotatably supporting said collet and said chuck, fluid pressure means for reciprocating said chuck toward and away from said collet, and fluid pressure control means including a main control valve operative in one position thereof to actuate said collet actuator to bar stock gripping position and to actuate said fluid pressure means to move said chuck, while said chuck is in bar stock releasing position, away from said collet, said control means including another valve operated at the conclusion of such movement of said chuck to actuate said chuck actuator to bar stock gripping position whereby the bar stock is rotatably supported and gripped by said collet and said chuck.

7. In combination, a collet and a chuck in coaxial alignment and in which bar stock is adapted to be gripped, fluid pressure collet and chuck actuators for actuating said collet and said chuck into and out of gripping engagement with the bar stock, fluid pressure means for reciprocating said chuck toward and away from said collet, and fluid pressure control means including a main control valve operative in one position thereof to actuate said collet actuator to bar stock releasing position and to actuate said fluid pressure means to move said chuck, and the bar stock gripped thereby, toward said collet to thus longitudinally feed the bar stock, and a chuck control valve carried by said chuck and effective to hold said chuck actuator in bar stock gripping position during such movement of said chuck and to actuate said chuck actuator to bar stock releasing position at the conclusion of such feeding movement.

8. In combination, a collet and a chuck in coaxial alignment and in which bar stock is adapted to be gripped, fluid pressure collet and chuck actuators for actuating said collet and said chuck into and out of gripping engagement with the bar stock, fluid pressure means for reciprocating said chuck toward and away from said collet, and fluid pressure control means including a main control valve operative in one position thereof to actuate said collet actuator to bar stock releasing position and to actuate said fluid pressure means to move said chuck, and the bar stock gripped thereby, toward said collet to thus longitudinally feed the bar stock, said main control valve being operative in another position to actuate said collet actuator to bar stock gripping position and to actuate said fluid pressure means to reverse the movement of said chuck, said control means also including a chuck control valve operative at the conclusion of the last-mentioned movement of said chuck to actuate the chuck actuator to bar stock gripping position whereby the bar stock is supported by said collet and said chuck, both of which then are in bar stock gripping position.

9. In combination, a collet and a chuck in coaxial alignment and in which bar stock is adapted to be gripped, fluid pressure collet and chuck actuators for actuating said collet and said chuck into and out of gripping engagement with the bar stock, fluid pressure means for reciprocating said chuck toward and away from said collet, and fluid pressure control means including a main control valve operative in one position thereof to actuate said collet actuator to bar stock gripping position and to actuate said fluid pressure means to move said chuck, while said chuck is in bar stock releasing position, away from said collet, a chuck control valve having a movable valve member effective in one position to communicate said chuck actuator with a fluid pressure source and in another position to release such fluid under pressure from said chuck actuator whereby said chuck is alternately actuated to bar stock gripping and releasing positions, and means for actuating said valve member at the conclusion of such chuck movement, from such another position to such one position whereby the bar stock is supported by said collet and said chuck, both of which then are in bar stock gripping position.

10. In combination, a collet and a chuck in coaxial alignment and in which bar stock is adapted to be gripped, fluid pressure collet and chuck actuators for actuating said collet and said chuck into and out of gripping engagement with the bar stock, fluid pressure means for reciprocating said chuck toward and away from said collet, and fluid pressure control means including a main control valve operative in one position thereof to actuate said collet actuator to bar stock gripping position and to actuate said fluid pressure means to move said chuck, while said chuck is in bar stock releasing position, away from said collet, a chuck control valve having a movable valve member effective in one position to communicate said chuck actuator with a fluid pressure source and in another position to release such fluid under pressure from said chuck actuator whereby said chuck is alternately actuated to bar stock gripping and releasing positions, means for actuating said valve member at the conclusion of such chuck movement, from such another position to such one position whereby the bar stock is gripped by said collet and said chuck, preparatory to reverse movement of said chuck, and a reversing valve having a fluid pressure actuated valve member therein between a first and a second position for communicating said fluid pressure means with a fluid pressure source to respectively move said chuck in opposite directions, said reversing valve member being actuated responsive to operation of said main control valve to move said chuck as aforesaid while said chuck is in bar stock releasing position and while said collet is in bar stock gripping position and to reverse the movement of said chuck while said chuck is in bar stock gripping position and while said collet is in bar stock releasing position.

11. A bar stock feed device comprising a support, a housing reciprocably mounted on said support, means for reciprocating said housing, a chuck journalled in said housing, jaws radially movably carried by said chuck into and out of gripping engagement with a length of bar stock adapted to extend through said housing and said chuck, fluid pressure actuating means effective to move said jaws inwardly into gripping engagement with such bar stock, valve means operated at the ends of the opposite strokes of said housing to control admission and release of fluid under pressure into and from said fluid pressure actuating means whereby, during the opposite strokes of said housing, said jaws are respectively in and out of gripping engagement with the bar stock, said means for reciprocating said housing being effective to hold said housing at the ends of its strokes independently of the actuation of said valve means.

12. The device of claim 11 wherein said fluid pressure actuating means comprises an annular cylinder in said housing coaxial to said chuck, an annular piston reciprocable in said cylinder, and bell crank levers pivotally mounted in said chuck and having their legs engaging said piston and the respective jaws to transmit axial piston movement to radial jaw movement.

13. In a chuck for bar stock feeding devices and the like, the combination of a housing, a chuck body journalled in said housing, bar stock gripping jaws radially slidably carried by said body, each jaw comprising a base part radially slidable in said body and a radially adjustable part mounted on said base part, said parts defining therebetween a radially extending hole which is formed with threads in said adjustable part, and a screw rotatable in such hole and held against axial movement by said base part, said screw having threaded engagement with the threads in said adjustable part whereby, upon rotation of said screw in opposite directions, said adjustable part is actuated radially inwardly and outwardly.

14. In a stock feeding device, the combination of a support, a housing reciprocable on said support, means for reciprocating said housing, a chuck in said housing having radially movable jaws adapted to be moved into and out of gripping engagement with a length of bar stock adapted to extend through said chuck, said chuck comprising a jaw carrying sleeve, another anti-friction bearing between said housing and sleeve journalling the latter for rotation in said housing, said housing being formed with a fluid pressure cylinder and a port for flow of fluid into and from said cylinder, a piston reciprocable in said cylinder, force-transmitting means effective to transmit piston movement to said jaws, and another anti-friction bearing between said piston and said force-transmitting means whereby the latter may rotate in unison with said sleeve and jaws without torque transmission to said piston.

15. The stock feeding device of claim 14 wherein said piston engages a ring axially slidably keyed in said cylinder, the latter moving said force-transmitting means through said another anti-friction bearing.

16. The stock feeding device of claim 14 wherein said force-transmitting means comprises bell crank levers pivotally mounted in said jaw sleeve and having opposite ends engaged with said jaws and with a ring secured to an element of said another anti-friction bearing.

References Cited in the file of this patent
UNITED STATES PATENTS

| | | |
|---|---|---|
| 2,310,259 | Ruppel | Feb. 9, 1943 |
| 2,572,741 | McCoy | Oct. 23, 1951 |
| 2,586,536 | Haller | Feb. 19, 1952 |
| 2,695,096 | Gridley | Nov. 23, 1954 |